(12) United States Patent
Hayashi et al.

(10) Patent No.: US 8,580,135 B2
(45) Date of Patent: Nov. 12, 2013

(54) DIE AND METHOD OF MANUFACTURING SAME

(75) Inventors: Hidekazu Hayashi, Osaka (JP); Kiyoshi Minoura, Osaka (JP); Akinobu Isurugi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 5 days.

(21) Appl. No.: 13/263,459

(22) PCT Filed: Apr. 6, 2010

(86) PCT No.: PCT/JP2010/002518
§ 371 (c)(1),
(2), (4) Date: Oct. 7, 2011

(87) PCT Pub. No.: WO2010/116728
PCT Pub. Date: Oct. 14, 2010

(65) Prior Publication Data
US 2012/0018613 A1    Jan. 26, 2012

(30) Foreign Application Priority Data
Apr. 9, 2009    (JP) ................. 2009-095267

(51) Int. Cl.
*C25F 3/00*    (2006.01)
(52) U.S. Cl.
USPC ............... 216/96; 216/13; 205/175; 438/688
(58) Field of Classification Search
USPC ................. 164/72; 205/175, 206, 57, 70; 249/114.1; 257/13; 349/35, 62, 113; 359/529, 566, 574, 575, 580, 586; 369/112.03; 425/335; 427/331; 428/137, 138, 141, 304.4, 29, 584, 428/667, 688, 707, 745; 445/48; 72/462
See application file for complete search history.

(56) References Cited

U.S. PATENT DOCUMENTS

| 4,193,848 A | 3/1980 | Severus-Laubenteid |
| 6,348,403 B1 * | 2/2002 | Raina et al. ............... 438/618 |

(Continued)

FOREIGN PATENT DOCUMENTS

| EP | 0756197 | 1/1997 |
| JP | 08-072091 | 3/1996 |

(Continued)

OTHER PUBLICATIONS

International Search Report for PCT/JP2010/002518 mailed Jul. 6, 2010.

(Continued)

*Primary Examiner* — Duy Deo
*Assistant Examiner* — Erin Bergner
(74) *Attorney, Agent, or Firm* — Nixon & Vanderhye P.C.

(57) ABSTRACT

A mold of the present invention includes: a base 12 made of glass or plastic; an inorganic underlayer 14 provided on a surface of the base 12; a buffer layer 16 provided on the inorganic underlayer 14, the buffer layer 16 containing aluminum; an aluminum layer 18a provided on a surface of the buffer layer 16; and a porous alumina layer 20 provided on a surface of the aluminum layer 18a. The porous alumina layer 20 has a plurality of recessed portions 22 whose two-dimensional size viewed in a direction normal to the surface is not less than 10 nm and less than 500 nm. The mold of the present invention has excellent adhesion between the aluminum layer and the base.

7 Claims, 5 Drawing Sheets

(56) References Cited

U.S. PATENT DOCUMENTS

| | | | |
|---|---|---|---|
| 6,359,735 B1 | 3/2002 | Gombert et al. | |
| 2003/0205475 A1* | 11/2003 | Sawitowski | 205/70 |
| 2004/0253817 A1* | 12/2004 | Imada et al. | 438/688 |
| 2007/0159698 A1* | 7/2007 | Taguchi et al. | 359/586 |
| 2007/0289874 A1* | 12/2007 | Masuda et al. | 205/171 |
| 2008/0050526 A1 | 2/2008 | Imada et al. | |
| 2008/0121528 A1 | 5/2008 | Bench et al. | |
| 2010/0086733 A1 | 4/2010 | Nakata | |

FOREIGN PATENT DOCUMENTS

| | | |
|---|---|---|
| JP | 10-316858 | 2/1998 |
| JP | 2001-517319 | 10/2001 |
| JP | 2003-531962 | 10/2003 |
| JP | 2005-156695 | 6/2005 |
| JP | 2006/059686 | 12/2005 |
| JP | 2006-028604 | 2/2006 |
| JP | 2008-075175 | 4/2008 |
| JP | 2010-090430 | 4/2010 |

OTHER PUBLICATIONS

International Preliminary Report on Patentability mailed 24 Nov. 2011 in corresponding PCT Application No. PCT/JP2010/002518.
European Search Report issued for European Patent Application No. 10761432.3-1227, dated Dec. 5, 2012.

* cited by examiner (a)

(b)

(a)

(b)

(a)

×50,000

(b)

×20,000

(a)

× 50,000

(b)

× 50,000

(a)

× 50,000

(b)

× 50,000

(a)

(b)

(c)

DIE AND METHOD OF MANUFACTURING SAME

This application is the U.S. national phase of International Application No. PCT/JP2010/002518 filed 6 Apr. 2010 which designated the U.S. and claims priority to JP 2009-095267 filed Apr. 9, 2009, the entire contents of each of which are hereby incorporated by reference.

TECHNICAL FIELD

The present invention relates to a mold and a method of fabricating the mold. In this specification, the "mold" includes molds that are for use in various processing methods (stamping and casting), and is sometimes referred to as a stamper. The mold can also be used for printing (including nanoprinting).

BACKGROUND ART

Display devices for use in TVs, cell phones, etc., and optical elements, such as camera lenses, etc., usually adopt an antireflection technique in order to reduce the surface reflection and increase the amount of light transmitted therethrough. This is because, when light is transmitted through the interface between media of different refractive indices, e.g., when light is incident on the interface between air and glass, the amount of transmitted light decreases due to, for example, Fresnel reflection, thus deteriorating the visibility.

An antireflection technique which has been receiving attention in recent years is forming over a substrate surface a very small uneven pattern in which the interval of recessed portions or raised portions is not more than the wavelength of visible light ($\lambda$=380 nm to 780 nm). See Patent Documents 1 to 4. The two-dimensional size of a raised portion of an uneven pattern which performs an antireflection function is not less than 10 nm and less than 500 nm.

This method utilizes the principles of a so-called motheye structure. The refractive index for light that is incident on the substrate is continuously changed along the depth direction of the recessed portions or raised portions, from the refractive index of a medium on which the light is incident to the refractive index of the substrate, whereby reflection of a wavelength band that is subject to antireflection is prevented.

The motheye structure is advantageous in that it is capable of performing an antireflection function with small incident angle dependence over a wide wavelength band, as well as that it is applicable to a number of materials, and that an uneven pattern can be directly formed in a substrate. As such, a high-performance antireflection film (or antireflection surface) can be provided at a low cost.

As the method of forming a motheye structure, using an anodized porous alumina layer which is obtained by means of anodization (or "anodic oxidation") of aluminum has been receiving attention (Patent Documents 2 to 4).

Now, the anodized porous alumina layer which is obtained by means of anodization of aluminum is briefly described. Conventionally, a method of forming a porous structure by means of anodization has been receiving attention as a simple method for making nanometer-scale micropores (very small recessed portions) in the shape of a circular column in a regular arrangement. An aluminum base is immersed in an acidic electrolytic solution of sulfuric acid, oxalic acid, phosphoric acid, or the like, or an alkaline electrolytic solution, and this is used as an anode in application of a voltage, which causes oxidation and dissolution. The oxidation and the dissolution concurrently advance over a surface of the aluminum base to form an oxide film which has micropores over its surface. The micropores, which are in the shape of a circular column, are oriented vertical to the oxide film and exhibit a self-organized regularity under certain conditions (voltage, electrolyte type, temperature, etc.). Thus, this anodized porous alumina layer is expected to be applied to a wide variety of functional materials.

A porous alumina layer formed under specific conditions includes cells in the shape of a generally regular hexagon which are in a closest packed two-dimensional arrangement when seen in a direction perpendicular to the film surface. Each of the cells has a micropore at its center. The arrangement of the micropores is periodic. The cells are formed as a result of local dissolution and growth of a coating. The dissolution and growth of the coating concurrently advance at the bottom of the micropores which is referred to as a barrier layer. As known, the size of the cells, i.e., the interval between adjacent micropores (the distance between the centers), is approximately twice the thickness of the barrier layer, and is approximately proportional to the voltage that is applied during the anodization. It is also known that the diameter of the micropores depends on the type, concentration, temperature, etc., of the electrolytic solution but is, usually, about ⅓ of the size of the cells (the length of the longest diagonal of the cell when seen in a direction vertical to the film surface). Such micropores of the porous alumina may constitute an arrangement which has a high regularity (periodicity) under specific conditions, an arrangement with a regularity degraded to some extent depending on the conditions, or an irregular (non-periodic) arrangement.

Patent Document 2 discloses a method of producing an antireflection film (antireflection surface) with the use of a stamper which has an anodized porous alumina film over its surface.

Patent Document 3 discloses the technique of forming tapered recesses with continuously changing pore diameters by repeating anodization of aluminum and a pore diameter increasing process.

The present applicant discloses in Patent Document 4 the technique of forming an antireflection film with the use of an alumina layer in which very small recessed portions have stepped lateral surfaces.

As described in Patent Documents 1, 2, and 4, by providing an uneven structure (macro structure) which is greater than a motheye structure (micro structure) in addition to the motheye structure, the antireflection film (antireflection surface) can be provided with an antiglare function. The two-dimensional size of a raised portion of the uneven structure which is capable of performing the antiglare function is not less than 1 μm and less than 100 μm. The entire disclosures of Patent Documents 1, 2, and 4 are herein incorporated by reference.

Utilizing such an anodized porous aluminum film can facilitate the fabrication of a mold which is used for formation of a motheye structure over a surface (hereinafter, "motheye mold"). In particular, as described in Patent Documents 2 and 4, when the surface of the anodized aluminum film as formed is used as a mold without any modification, a large effect of reducing the manufacturing cost is achieved. The structure of the surface of a motheye mold which is capable of forming a motheye structure is herein referred to as "inverted motheye structure".

The above-described motheye mold can be fabricated using an aluminum base, such as typically a substrate made of aluminum or a cylinder made of aluminum, or an aluminum film formed on a support that is made of a different material, such as typically a glass substrate.

CITATION LIST

Patent Literature

Patent Document 1: Japanese PCT National Phase Laid-Open Publication No. 2001-517319
Patent Document 2: Japanese PCT National Phase Laid-Open Publication No. 2003-531962
Patent Document 3: Japanese Laid-Open Patent Publication No. 2005-156695
Patent Document 4: WO 2006/059686

SUMMARY OF INVENTION

Technical Problem

The present inventor fabricated a motheye mold using an aluminum film formed on a glass substrate and encountered a problem that adhesion between the aluminum film (part of which is an anodized film) and the glass substrate deteriorates in the anodization step or the etching step. This problem was more serious when the glass substrate was a substrate made of glass which contains an alkaline metal (soda lime glass). The present inventor also encountered a problem that, when a plastic film was used as the base, the adhesion between the aluminum film and the plastic film deteriorated. Note that, herein, the adhesion between the base and the aluminum film refers not only to the inseparability of an aluminum film in the case where the aluminum film is directly formed on a surface of the base but also to the inseparability of an aluminum film in the case where another layer is interposed between the surface of the base and the aluminum film.

The present invention was conceived for the purpose of solving the above problems. One of the objects of the present invention is to provide a method of forming a motheye mold with the use of an aluminum film formed on a glass base or a plastic base, in which the adhesion between the aluminum film and the glass base or the plastic base is improved.

Solution to Problem

A mold of the present invention includes a base made of glass or plastic; an inorganic underlayer provided on a surface of the base; a buffer layer provided on the inorganic underlayer, the buffer layer containing aluminum; an aluminum layer provided on a surface of the buffer layer; and a porous alumina layer provided on a surface of the aluminum layer, the porous alumina layer having an inverted motheye structure in its surface, the inverted motheye structure having a plurality of recessed portions whose two-dimensional size viewed in a direction normal to the surface is not less than 10 nm and less than 500 nm.

In one embodiment, the inorganic underlayer is preferably a silicon oxide layer or a titanium oxide layer. In one embodiment, the thickness of the inorganic underlayer is preferably not less than 100 nm and not more than 200 nm.

In one embodiment, the buffer layer contains aluminum and either of oxygen or nitrogen, and the buffer layer has such a profile that a content of the aluminum is higher in a portion which is closer to the porous alumina layer than in another portion which is closer to the inorganic underlayer. In one embodiment, the thickness of the buffer layer is preferably not less than 100 nm and not more than 200 nm.

A mold fabrication method of the present invention is a method of fabricating a mold that has an inverted motheye structure in its surface, the inverted motheye structure having a plurality of recessed portions whose two-dimensional size viewed in a direction normal to the surface is not less than 10 nm and less than 500 nm, the method including the steps of: (a) providing a mold base which includes a base made of glass or plastic, an inorganic underlayer provided on a surface of the base, a buffer layer provided on the inorganic underlayer, the buffer layer containing aluminum, and an aluminum layer provided on a surface of the buffer layer; (b) partially anodizing the aluminum layer to form a porous alumina layer which has a plurality of very small recessed portions; (c) after step (b), allowing the porous alumina layer to be in contact with an etching solution, thereby enlarging the plurality of very small recessed portions of the porous alumina layer; and (d) after step (c), further anodizing the porous alumina layer to grow the plurality of very small recessed portions.

In one embodiment, the inorganic underlayer is preferably a silicon oxide layer or a titanium oxide layer. In one embodiment, the thickness of the inorganic underlayer is preferably not less than 100 nm and not more than 500 nm.

In one embodiment, the buffer layer contains aluminum and either of oxygen or nitrogen, and the buffer layer has such a profile that a content of the aluminum is higher in a portion which is closer to the porous alumina layer than in another portion which is closer to the inorganic underlayer. In one embodiment, the thickness of the buffer layer is preferably not less than 100 nm and not more than 200 nm.

In one embodiment, step (b) and step (c) may be further performed after step (d).

Advantageous Effects of Invention

According to the present invention, in a method of fabricating a motheye mold with the use of an aluminum layer formed on a base made of glass or plastic, the adhesion between the aluminum layer and the glass or plastic base can be improved. In the mold of the present invention, the adhesion between the aluminum layer and the glass or plastic base is excellent so that, even when the mold is used, the aluminum layer (at least part of which is an anodized layer) does not peel off from the glass substrate.

DESCRIPTION OF EMBODIMENTS

Figure 1:
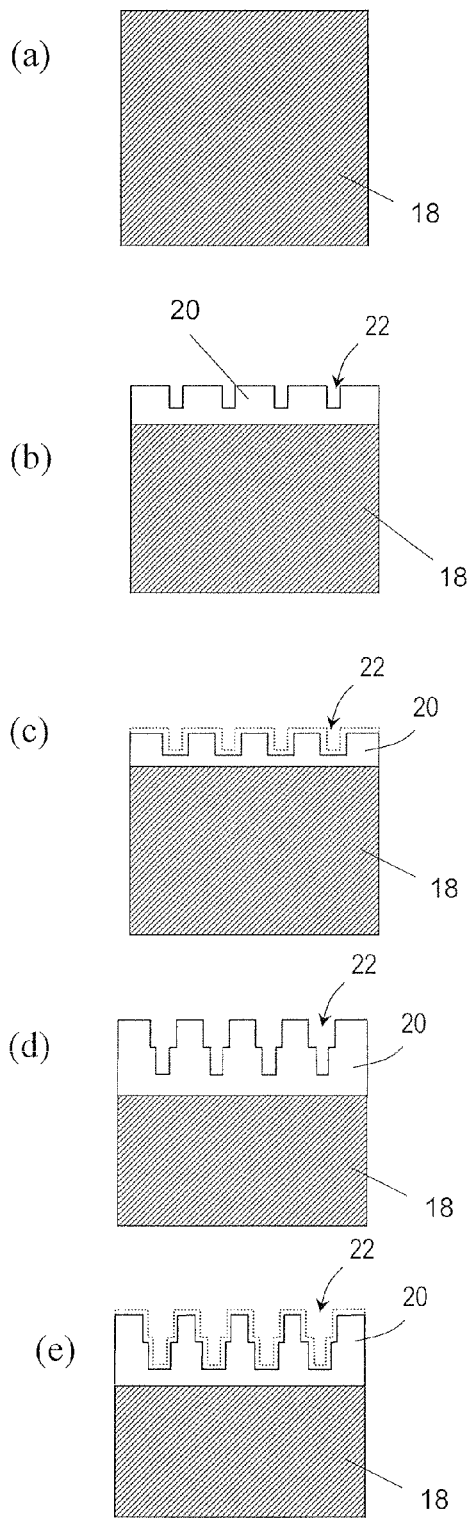
FIG. 1 (a) to (e) are schematic cross-sectional views for illustrating a method of fabricating a mold according to an embodiment of the present invention.

Hereinafter, a motheye mold and a method of fabricating the motheye mold according to an embodiment of the present invention are described with reference to the drawings. Note that the present invention is not limited to embodiments which will be described below.

First, as shown in FIG. 1(a), a mold base is provided which has an aluminum layer (Al layer) 18 over its surface. In FIGS. 1(a) to 1(e), for the sake of simplicity, only the Al layer 18 is shown. The Al layer 18 is formed by sputtering using, for example, an aluminum target with a purity of 99.99 mass % or higher. The thickness of the Al layer 18 is, for example, 1000 nm (1 µm). The thickness of the Al layer 18 is preferably not less than 100 nm for the purpose of obtaining an anodized alumina layer which has a surface structure for use as the motheye mold. In view of productivity, it is preferably not more than 3000 nm. As will be described later, a mold fabrication method of an embodiment of the present invention is characterized in using a mold base 10 shown in FIG. 2(a).

Then, part of the Al layer 18 (surface portion) is anodized under predetermined conditions to form a porous alumina layer 20 which has micropores 22 as shown in FIG. 1(b). The size of the micropores 22, the formation density of the micropores 22, the depth of the micropores 22, etc., can be controlled according to the anodization conditions (e.g., the forming voltage, the type and concentration of the electrolytic solution, the duration of anodization, etc.). By controlling the level of the forming voltage, the regularity of the arrangement of the micropores 22 can be controlled. For example, a voltage at 80 V is applied for 40 seconds with the use of a 0.1 M oxalic aqueous solution at 20° C., whereby a porous alumina layer 20 can be obtained in which the distance between adjacent micropores is 190 nm and which has a thickness of about 100 nm.

Note that the first-formed porous alumina layer 20 may be removed when necessary. The first-formed porous alumina layer 20 may include many defects due to the effects of impurities and the like. The thickness of the first-formed porous alumina layer 20 that is to be removed is preferably not less than 200 nm in view of reproducibility. In view of productivity, it is preferably not more than 2000 nm. As a matter of course, when necessary, the first-formed porous alumina layer 20 may be partially removed (e.g., to a certain depth from the surface). The removal of the porous alumina layer 20 can be realized by a known method, e.g., immersion in a phosphoric acid aqueous solution or a chromium-phosphoric acid mixture solution for a predetermined time period.

Then, the porous alumina layer 20 which have the micropores 22 is brought into contact with an alumina etchant to etch away a predetermined amount, such that the pore diameter of the micropores 22 is increased as shown in FIG. 1(c). Employing wet etching in this step enables substantially isotropic expansion of the pore wall and the barrier layer. The etching amount (i.e., the size and depth of the micropores 22) can be controlled by adjusting the type and concentration of the etching solution and the etching duration. The etching solution used herein may be an aqueous solution of an organic acid, such as phosphoric acid, formic acid, acetic acid, citric acid, or the like, of 10 mass %, or a chromium-phosphoric acid mixture solution.

Thereafter, the Al layer 18 is again partially anodized such that the micropores 22 are grown in the depth direction and the thickness of the porous alumina layer 20 is increased as shown in FIG. 1(d). Here, the growth of the micropores 22 starts at the bottom of the previously-formed micropores 22, so that the lateral surface of the micropores 22 has a stepped shape.

Thereafter, when necessary, the porous alumina layer 20 is brought into contact with an etchant of alumina to be further etched such that the diameter of the micropores 22 is further increased as shown in FIG. 1(e). The etching solution used in this step may preferably be the above-described etching solution. Practically, the same etching bath may be used.

In this way, by alternately repeating the anodization step (FIG. 1(b)) and the etching step (FIG. 1(c)) as described above, the porous alumina layer 20 provided with the micropores (very small recessed portions) 22, which has a desired uneven pattern, can be obtained. By appropriately determining the conditions for each of the anodization steps and the etching steps, the size, formation density, and depth of the micropores 22 as well as the stepped shape of the lateral surface of the micropores 22 can be controlled. To decrease the bottom portion of the micropores 22, the process is preferably ended with the anodization step (without performing any subsequent etching step). Thus, in a motheye structure which is formed using the resultant motheye mold 100 (see FIG. 2(b)), the raised portions can have small tips, so that the antireflection effects can be improved. The motheye structure preferably has a plurality of raised portions each of which has a two-dimensional size of not less than 10 nm and less than 500 nm when seen in a direction normal to the surface. Preferably, the distance between adjacent raised portions is not less than 30 nm and less than 600 nm.

In the example described herein, the anodization step and the etching step are alternately performed. However, between the anodization step and the etching step, or between the etching step and the anodization step, a washing step and a drying step subsequent thereto may be performed. Also, in an interval between the anodization steps, the anodization conditions such as the forming voltage can be changed.

As described above, in the above fabrication method, when the mold base used was a glass substrate, especially when it was a substrate of soda lime glass, the adhesion between the aluminum layer (part of which is an anodized layer) and a glass substrate deteriorated in the anodization step or the etching step. This problem was more serious when a substrate made of glass containing an alkaline metal (soda lime glass) was used as the glass substrate. When a plastic film was used as the base, the adhesion between the aluminum film and the plastic film deteriorated. This problem will be described later.

Figure 2:
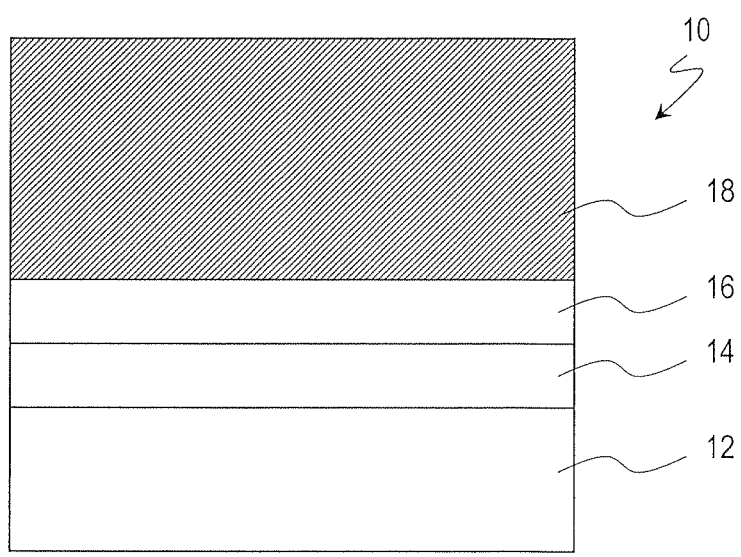
FIG. 2 (a) is a schematic cross-sectional view of a mold base 10 which is for use in a mold fabrication method according to an embodiment of the present invention. (b) is a schematic cross-sectional view of a motheye mold 100 which is fabricated using the mold base 10.
Figure 2:
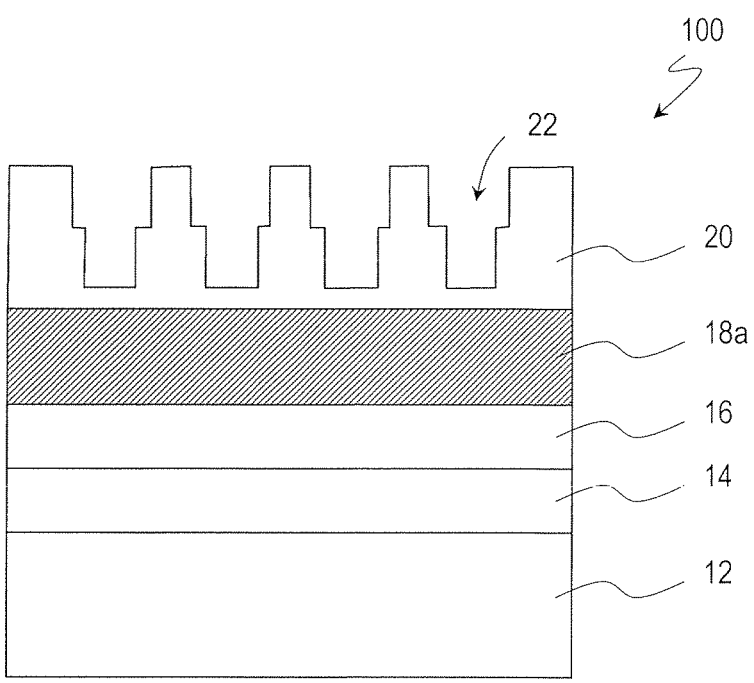

Hereinafter, a mold base for use in a mold fabrication method and a fabricated motheye mold according to an embodiment of the present invention are described with reference to FIG. 2 and FIG. 3, with examples of experiments conducted by the present inventor with the use of a glass substrate. FIG. 2(a) is a schematic cross-sectional view of a mold base 10 which is for use in a mold fabrication method according to an embodiment of the present invention. FIG. 2(b) is a schematic cross-sectional view of a motheye mold 100 which is fabricated using the mold base 10. FIGS. 3(a) and 3(b) are schematic cross-sectional views of mold bases 30A and 30B of comparative examples.

As shown in FIG. 2(a), the mold base 10 includes a glass base 12, an inorganic underlayer 14 provided on a surface of the glass base 12, a buffer layer 16 which is provided on the inorganic underlayer 14 and which contains aluminum, and an aluminum layer 18 provided on a surface of the buffer layer 16. Note that, when a conductive layer (preferably, a valve metal layer) is provided as a backing in order to uniformly anodize the aluminum layer 18, the conductive layer is preferably provided between the inorganic underlayer 14 and the buffer layer 16 or between the buffer layer 16 and the aluminum layer 18.

The inorganic underlayer 14 is directly formed on a surface of the glass substrate 12. The inorganic underlayer 14 has the function of preventing an alkaline metal element contained in the glass substrate 12 from dissolving out of the glass substrate 12. In view of the adhesion with the glass substrate 12, the inorganic underlayer 14 is preferably made of an inorganic oxide or an inorganic nitride. When an inorganic oxide is used, for example, the inorganic underlayer 14 is preferably a silicon oxide layer or a titanium oxide layer. When an inorganic nitride is used, for example, the inorganic underlayer 14 is preferably a silicon nitride layer. It is also preferred that the thermal expansion coefficient of the inorganic underlayer 14 is adapted by adding an impurity to the inorganic oxide layer or inorganic nitride layer. For example, when a silicon oxide layer is used, the thermal expansion coefficient can be increased by adding germanium (Ge) phosphorus (P), or boron (B). When 5 mass % Ge is added to the silicon oxide, for example, the thermal expansion coefficient is about $2.8 \times 10^{-6}/°C.$, which is about three times that obtained when Ge is not added.

The thickness of the inorganic underlayer 14 is preferably not less than 40 nm and, more preferably, not less than 100 nm. When the thickness of the inorganic underlayer 14 is less than 40 nm, the effects of provision of the inorganic underlayer 14 are not sufficiently produced, so that dissolution of an alkaline metal element out of the glass substrate 12 cannot be sufficiently blocked in some cases. TABLE 1 shows the results of evaluation of the alkaline passivation property.

The evaluation method is now generally described. The samples shown in TABLE 1 (each of which is a square soda lime glass plate of 70 mm×70 mm) were washed by pure water ultrasonic cleaning for two minutes. Then, each of the samples was placed on a platinum dish of 65 mmΦ such that an analysis surface faces onto the platinum dish (i.e., the analysis surface is the lower surface), and was subjected to a heat treatment (heated for about two hours to reach 200° C., maintained at 200° C. for one hour, and thereafter cooled by means of spontaneous heat radiation (for about a half day)). Thereafter, the analysis surface of each sample was exposed to pure water, and Na dissolved into the pure water was quantitated using a flame method. As seen from TABLE 1, the amount of dissolved alkaline can be reduced by forming a 40 nm thick SiO$_2$ film. The alkaline blocking effect can be greatly increased by forming a 100 nm thick SiO$_2$ film.

TABLE 1

| Samples | Amount of Dissolved Alkaline (ng/cm$^2$) |
|---|---|
| Bare Glass Plate (Soda Lime Glass) | 12 |
| Glass Plate with 40 nm thick SiO$_2$ Layer | 8 |
| Glass Plate with 100 nm thick SiO$_2$ Layer | 2 |

The thickness of the inorganic underlayer 14 is preferably not more than 500 nm and, more preferably, not more than 200 nm. If the thickness of the inorganic underlayer 14 is more than 500 nm, the time required for formation of the inorganic underlayer 14 will be unduly long. Also, the adhesion between the glass substrate 12 and the inorganic underlayer 14 may deteriorate due to thermal stress (shear stress) which is attributed to the difference in thermal expansion coefficient between the glass substrate 12 and the inorganic underlayer 14. In the case where a flexible base such as a plastic film is used, if the thickness of the inorganic underlayer 14 is more than 500 nm, a crack may be formed in the inorganic underlayer 14 when the base is bent.

The buffer layer 16 is provided between the inorganic underlayer 14 and the aluminum layer 18. The buffer layer 16 has the function of improving the adhesion between the inorganic underlayer 14 and the aluminum layer 18. The buffer layer 16 is made of a material which has excellent acid resistance and protects the inorganic underlayer 14 from acid.

The buffer layer 16 preferably contains aluminum and either of oxygen or nitrogen. The buffer layer 16 preferably has such a profile that the aluminum content is higher in a portion which is closer to the aluminum layer 18 than in another portion which is closer to the inorganic underlayer 14, although the oxygen or nitrogen content may be uniform. This is because the property values, such as the thermal expansion coefficient, exhibit excellent conformity. The thickness of the buffer layer 16 is preferably not less than 40 nm and, more preferably, not less than 100 nm. The thickness of the buffer layer 16 is preferably not more than 500 nm and, more preferably, not more than 200 nm. If the thickness of the buffer layer 16 is less than 40 nm, it is difficult to sufficiently protect the inorganic underlayer 14 from a treatment solution permeating from the aluminum layer 18 side (the electrolytic solution in the anodization step and/or the etching solution in the etching step), i.e., the effects of provision of the buffer layer 16 are not sufficiently produced. If the thickness of the buffer layer 16 is more than 500 nm, the time required for formation of the buffer layer 16 will be unduly long.

The profile of the aluminum content in the buffer layer 16 along the thickness direction may vary stepwise or may continuously vary. For example, when the buffer layer 16 is formed of aluminum and oxygen, a plurality of aluminum oxide layers which have gradually decreasing oxygen contents are formed, and then, the aluminum layer 18 is formed on the uppermost aluminum oxide layer. This process also applies to a case where the buffer layer 16 is formed of aluminum and nitrogen.

The aluminum layer 18 may be formed using a known method (e.g., electron beam deposition or sputtering). Here, the aluminum layer 18 having a thickness of about 1 μm is preferably formed through a plurality of separate cycles rather than formed at once in one cycle. Specifically, it is preferred to repeat the cycle of depositing aluminum to a certain thickness before an intermission of a certain time period and resuming the deposition after the intermission till the aluminum layer 18 having a predetermined thickness (e.g., 1 μm) is obtained, rather than to continuously deposit aluminum to the predetermined thickness. For example, it is preferred that the aluminum layer 18 having a thickness of about 1 μm is obtained by forming 20 aluminum layers each of which has a thickness of 50 nm in such a manner that every formation of the 50 nm thick aluminum layer is followed by an intermission. In this way, the deposition of aluminum is carried out in a plurality of separate cycles, whereby the quality of the finally-obtained aluminum layer 18 (e.g., the chemical resistance or adhesion) can be improved. This is probably because continuous deposition of aluminum increases the temperature of a base (a base having a surface on which the aluminum layer is to be formed), and as a result, the distribution of thermal stress in the aluminum layer 18 becomes nonuniform so that the film quality deteriorates.

The motheye mold 100 shown in FIG. 2(*b*) is obtained by forming the porous alumina layer 20 using the mold base 10 shown in FIG. 2(*a*) according to the method which has been described with reference to FIGS. 1(*a*) to 1(*e*). The mold 100 includes the glass base 12, the inorganic underlayer 14 provided on the surface of the glass base 12, the buffer layer 16 which is provided on the inorganic underlayer 14 and which contains aluminum, the aluminum layer 18*a* provided on the surface of the buffer layer 16, and the porous alumina layer 20 provided on the surface of the aluminum layer 18*a*.

Hereinafter, a motheye mold and a fabrication method thereof according to an embodiment of the present invention are described in detail, with inventive examples and comparative examples.

INVENTIVE EXAMPLE 1 AND COMPARATIVE EXAMPLES 1 AND 2

A mold base of Inventive Example 1 which has the structure of the mold base 10 shown in FIG. 2(*a*) was fabricated as described below.

As the glass substrate 12, a substrate of soda lime glass (or "blue glass plate") having a thickness of 2.8 mm was provided.

A $SiO_2$ layer 14 having a thickness of about 100 nm, a buffer layer 16 (containing aluminum and oxygen) having a thickness of about 100 nm, an aluminum layer 18 having a thickness of 1 μm were formed directly over the surface of the glass substrate 12. These layers were all formed in the same vacuum chamber by sputtering. The sputtering conditions were as follows. The vacuum degree of the background: $1 \times 10^{-5}$ Torr (0.0013 Pa), the atmosphere gas: Ar, the vacuum degree during sputtering: $1 \times 10^{-3}$ Torr (0.13 Pa), the Al target purity: 99.999 mass %.

Here, as the buffer layer 16, a buffer layer including a plurality of aluminum oxide layers of different oxygen contents was formed. The plurality of aluminum oxide layers were formed to have such a profile that an aluminum oxide layer which was closer to the $SiO_2$ layer 14 had a higher oxygen content, in other words, such a profile that the aluminum content was higher in a portion which was closer to the aluminum layer 18 than in another portion which was closer to the $SiO_2$ layer 14. Note that the buffer layer 16 may be formed by a single aluminum oxide layer.

When the buffer layer 16 was formed by two aluminum oxide layers, the oxygen content of one of the aluminum oxide layers which was closer to the $SiO_2$ layer 14 was not less than 30 at % and not more than 60 at %, the oxygen content of the other aluminum oxide layer which was closer to the aluminum layer 18 was not less than 5 at % and not more than 30 at %, and the oxygen contents of the two aluminum oxide layers simultaneously met these conditions.

When the buffer layer 16 was formed by three aluminum oxide layers, the oxygen content of one of the aluminum oxide layers which was closer to the $SiO_2$ layer 14 was not less than 35 at % and not more than 60 at %, the oxygen content of the middle aluminum oxide layer was not less than 20 at % and not more than 35 at %, the oxygen content of the other aluminum oxide layer which was closer to the aluminum layer 18 was not less than 5 at % and not more than 20 at %, and the oxygen contents of the three aluminum oxide layers simultaneously met these conditions. As a matter of course, the buffer layer 16 may be formed by four or more aluminum oxide layers.

The buffer layer 16 may be formed by, for example, using any of the three methods (1) to (3) described below.

(1) The film is formed by reactive sputtering with the use of a mixture gas of Ar gas and $O_2$ gas and an Al target which contains the oxygen element. Here, the oxygen content in the target is preferably not less than 1 at % and not more than 40 at %. If the oxygen content in the target is less than 1 at %, the effects of oxygen contained in the target are insufficient. If the oxygen content in the target is more than 40 at %, the $O_2$ gas is unnecessary.

(2) The film is formed by reactive sputtering with the use of a pure Ar gas as the sputtering gas and an Al target which contains the oxygen element. Here, the oxygen content in the target is preferably not less than 5 at % and not more than 60 at %. If the oxygen content in the target is less than 5 at %, the amount of oxygen contained in the formed aluminum oxide layer may be insufficient. If the oxygen content in the target is more than 60 at %, the content of the oxygen element in the formed aluminum oxide layer may be excessively high. If the content of the oxygen element in the aluminum oxide layer which is closer to the inorganic underlayer is more than 60 at %, the adhesion between the inorganic underlayer ($SiO_2$) and the aluminum oxide layer may deteriorate.

(3) The film is formed by reactive sputtering with the use of a pure aluminum target. Here, the flow rate ratio of the Ar gas and the $O_2$ gas of the mixture gas used in the sputtering is, approximately, more than 2:0 and not more than 2:1. If the flow rate ratio of the Ar gas and the $O_2$ gas is more than 2:1, the content of the oxygen element in the formed aluminum oxide layer may be excessively high.

As Inventive Example 1, the buffer layer 16 including two aluminum oxide layers was formed using the above method (3). The oxygen contents of the aluminum oxide layers were 5 at % and 48 at %, which met the above conditions. The oxygen content was measured by X-ray photoelectron spectroscopy (ESCA).

The thermal expansion coefficients of the respective constituents of the mold base 10 (in the range from room temperature to 100° C.) are as follows:
Substrate 12: soda lime glass: $8.7 \times 10^{-6}/°C$.
Inorganic underlayer 14: $SiO_2$: $1.0 \times 10^{-6}/°C$.
Buffer layer 16: $Al_2O_3$: $6.9 \times 10^{-6}/°C$.
Aluminum layer 18: Al: $23 \times 10^{-6}/°C$.

Here, in Inventive Example 1, the oxygen content of the buffer layer 16 is lower than that of $Al_2O_3$ (although accurate measurement is difficult). Therefore, the thermal expansion coefficient of the buffer layer 16 is larger than that of $Al_2O_3$ ($6.9 \times 10^{-6}/°C$.) and is smaller than that of Al ($23 \times 10^{-6}/°C$.). Thus, by providing the buffer layer 16, the adhesion to the aluminum layer 18 is improved.

The thermal expansion coefficient of the inorganic underlayer 14 that is made of $SiO_2$ is smaller than those of the substrate 12 and the buffer layer 16 (lowermost layer). Therefore, it is preferred to dope $SiO_2$ with Ge at about 5 mass % to 10 mass % such that the thermal expansion coefficients conform to each other.

Figure 3:
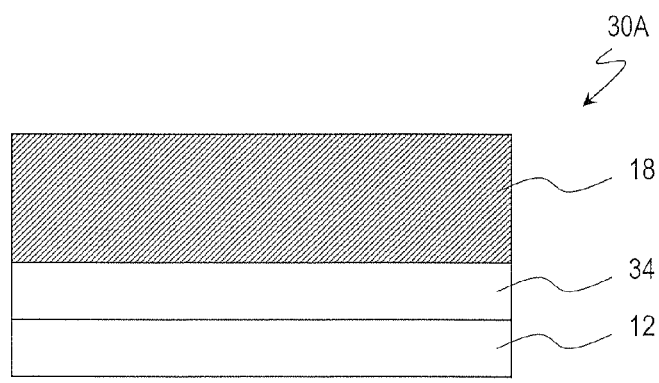
FIG. 3 (a) and (b) are schematic cross-sectional views of mold bases 30A and 30B of comparative examples, respectively.
Figure 3:
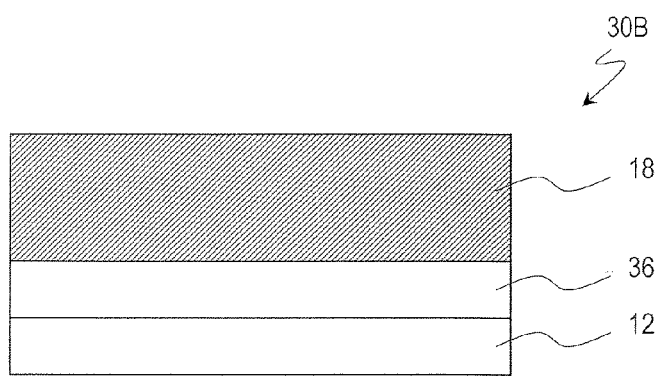

The mold base 30A of Comparative Example 1 shown in FIG. 3(*a*) was formed according to the mold base fabrication method used in the above Inventive Example except that the buffer layer 16 was not formed, and instead, an inorganic underlayer 34 was formed of $SiO_2$ on the glass substrate 12 before the formation of the aluminum layer 18.

The mold base 30B of Comparative Example 2 shown in FIG. 3(*b*) was formed according to the mold base fabrication method used in the above Inventive Example except that the inorganic underlayer 14 was not formed, and instead, a buffer layer 36 which was the same as the above buffer layer was formed on the glass substrate 12 before the formation of the aluminum layer 18.

The obtained mold bases were evaluated in terms of adhesion between the glass substrate 12 and the aluminum layer 18 by a so-called peeling test (crosscut test) as will be described below.

In each of the mold bases, the layers formed on the glass substrate 12 were cut into a matrix of 5×5 squares, each having a size of 1 cm×1 cm, using a utility knife, with the incision reaching the surface of the glass substrate 12. An adhesive tape (Scotch tape BH-24 manufactured by Sumitomo 3M Limited) was tightly placed onto the aluminum layer 18 so as to cover a region of the cut squares and then peeled off from the aluminum layer 18. The number of squares (including the aluminum layer 18, the inorganic underlayer 14, 34 and/or the buffer layer 16, 36) which were removed together with the peeled adhesive tape was counted for evaluation. The results of the evaluation are shown in TABLE 2. ⊚ means that no square was removed. ○ means that the number of removed squares was not less than 1 and less than 5. Δ means that the number of removed squares was not less than 5 and less than 10. X means that the number of removed squares was not less than 10.

The peeling test was carried out on the following samples in different phases:
"INITIAL": Samples immediately after fabrication of the above mold bases;
"ANODIZATION+ETCHING": Samples with the inverted motheye structure which was formed through the fabrication steps that have been previously described with reference to FIGS. 1(a) to 1(e). (The anodization conditions were treatment solution: oxalic acid (0.05 mol/L(liter)), treatment temperature: 5° C., voltage: 80 V, and treatment duration: 1 min. The etching conditions were treatment solution: phosphoric acid (8 mol/L), treatment temperature: 30° C., and treatment duration: 20 min.)
"FINAL": Samples obtained by applying a mold release agent over a surface with the inverted motheye structure and baking the surface at 100° C. for 20 minutes.

TABLE 2

|  | INVENTIVE EXAMPLE 1 | COMPARATIVE EXAMPLE 1 | COMPARATIVE EXAMPLE 2 |
| --- | --- | --- | --- |
| INITIAL | ⊚ | Δ | ○ |
| ANODIZATION + ETCHING | ○ | Δ | X |
| FINAL | ○ | X | X |

As clearly seen from the results of TABLE 2, in both Comparative Examples 1 and 2, the adhesion was "X" in the FINAL phase. On the other hand, when the mold base of the inventive example was used, the adhesion between the glass substrate 12 and the aluminum layer 18 was improved to be "○" in the FINAL phase.

In Comparative Example 1, it is inferred that, in the mold base 30A that only included the inorganic underlayer 34 made of $SiO_2$, $SiO_2$ was chemically damaged by the treatment solution entering from the aluminum layer 18 side in the anodization step and/or the etching step.

In Comparative Example 2, it is inferred that, in the mold base 30B that only included the buffer layer 36, the treatment solution entered a gap between the glass substrate 12 and the buffer layer 36 in the anodization step and/or the etching step, and the alkaline metal element contained in the glass was dissolved out due to a reaction with the treatment solution and caused corrosion of the anodized alumina layer.

INVENTIVE EXAMPLE 2, COMPARATIVE EXAMPLES 3 AND 4

In Inventive Example 2, a plastic film 12 was used whereas the glass substrate 12 was used in the above-described mold base of Inventive Example 1.

The mold base of Inventive Example 2 has the same structure as that of the mold base 10 shown in FIG. 2. Specifically, the mold base of Inventive Example 2 includes the plastic film 12, the inorganic underlayer 14 provided on the surface of the plastic film 12, the buffer layer 16 which is provided on the inorganic underlayer 14 and which contains aluminum, and the aluminum layer 18 provided on the surface of the buffer layer 16. Note that, when a conductive layer (preferably, a valve metal layer) is provided as a backing in order to uniformly anodize the aluminum layer 18 as is when the glass substrate 12 is used, the conductive layer is preferably provided between the inorganic underlayer 14 and the buffer layer 16 or between the buffer layer 16 and the aluminum layer 18. To prevent occurrence of electrochemical corrosion, the conductive layer is preferably made of a material which has a small difference in standard electrode potential from aluminum, such as titanium, magnesium, or the like. Titanium is known to have the effect of improving adhesion.

In Inventive Example 2, the plastic film 12 used was a PET (polyethylene terephthalate) film (manufactured by KIMOTO CO., LTD., 188 μm thick). On the PET film, a 70 nm thick $SiO_2$ layer was formed as the inorganic underlayer 14, and a 150 nm thick aluminum oxide monolayer (oxygen content: 30 at %) was formed as the buffer layer 16. Thereafter, a 1 μm thick aluminum layer 18 was formed. A series of these steps were carried out in the same way as in Inventive Example 1.

The base of Comparative Example 3 has the same structure as that of the mold base 30A shown in FIG. 3(a). The base of Comparative Example 3 was fabricated according to the mold base fabrication method used in the above Inventive Example except that the buffer layer 16 was not formed, and instead, the inorganic underlayer 34 was formed of $SiO_2$ on the plastic film (PET film) 12 before the formation of the aluminum layer 18.

The base of Comparative Example 4 has the same structure as that of the mold base 30B shown in FIG. 3(b). The base of Comparative Example 4 was fabricated according to the mold base fabrication method used in the above Inventive Example except that the inorganic underlayer 14 was not formed, and instead, a buffer layer 36 which was the same as the above was formed on the plastic film (PET film) 12 before the formation of the aluminum layer 18.

The adhesion between the plastic film 12 and the aluminum layer 18 was evaluated in the same way as described above at a time immediately after the formation of the aluminum layer 18 and at a time after immersion in a phosphoric acid aqueous solution (1M, 30° C.) for 30 minutes. As for the mold base 30A of Comparative Example 3, both the result of evaluation immediately after the formation of the film and the result of evaluation after the immersion in the phosphoric acid aqueous solution were "X", i.e., the adhesion was poor. As for the mold base 30B of Comparative Example 4, the result of evaluation immediately after the formation of the film was "Δ", but the result of evaluation after the immersion in the phosphoric acid aqueous solution was "X". As opposed to these cases, as for the mold base 10 of Inventive Example 2, both the result of evaluation immediately after the formation of the film and the result of evaluation after the immersion in the phosphoric acid aqueous solution were "○", i.e., the adhesion was excellent.

Figure 4:
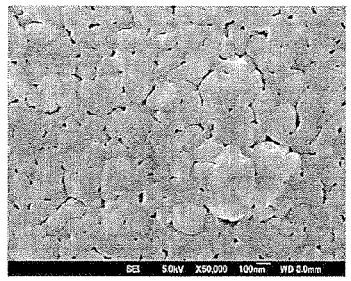
FIG. 4 (a) and (b) are SEM images of a surface of an aluminum layer of a mold base 30A of comparative example 3. (a) is a SEM image taken immediately after formation of the aluminum layer. (b) is a SEM image taken after immersion in a phosphoric acid aqueous solution.
Figure 4:
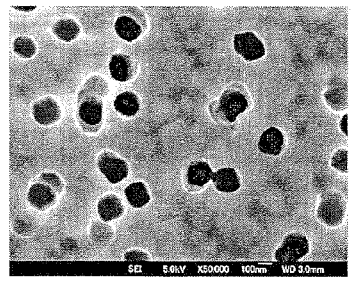
Figure 5:
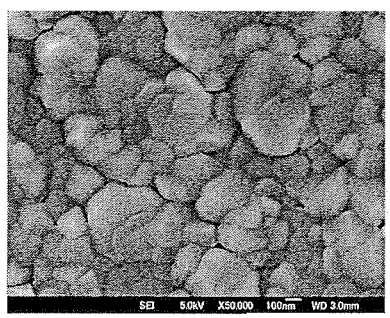
FIG. 5 (a) and (b) are SEM images of a surface of an aluminum layer of a mold base 30B of comparative example 4. (a) is a SEM image taken immediately after formation of the aluminum layer. (b) is a SEM image taken after immersion in a phosphoric acid aqueous solution.
Figure 5:
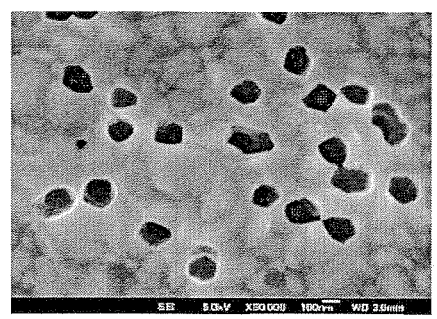
Figure 6:
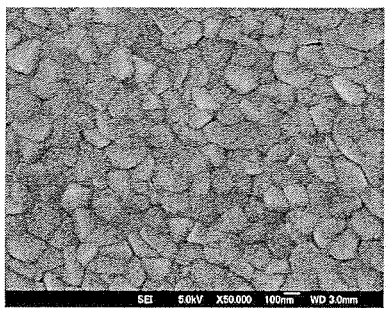
FIG. 6 (a) and (b) are SEM images of a surface of an aluminum layer of a mold base 10 of Inventive Example 2. (a) is a SEM image taken immediately after formation of the aluminum layer. (b) is a SEM image taken after immersion in a phosphoric acid aqueous solution.
Figure 6:
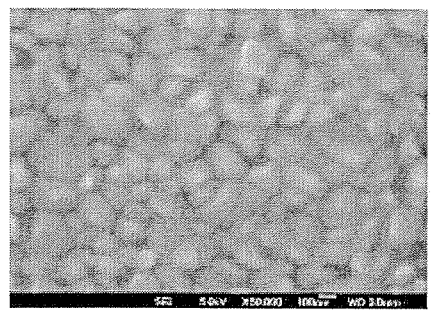

FIGS. 4(a) and 4(b) show SEM images of the surface of the aluminum layer 18 of the mold base 30A of Comparative Example 3. FIGS. 5(a) and 5(b) show SEM images of the surface of the aluminum layer 18 of the mold base 30B of Comparative Example 4. FIGS. 6(a) and 6(b) show SEM images of the surface of the aluminum layer 18 of the mold base 10 of Inventive Example 2. In FIG. 4 to FIG. 6, (a) shows a SEM image of the aluminum layer 18 which was taken immediately after the formation of the aluminum layer 18. (b) shows a SEM image of the aluminum layer 18 which was taken after immersion in the phosphoric acid aqueous solution.

Small black spots which are seen in FIG. 4(a) are pits (recesses). It is seen from FIG. 4(b) that the pits were enlarged by immersion in the phosphoric acid aqueous solution.

It is seen from the comparison of FIGS. 5(a) and 5(b) with FIGS. 4(a) and 4(b) that the pits of the mold base 30B of Comparative Example 4 were smaller both in number and size than the pits of the mold base 30A of Comparative Example 3.

Thus, if the aluminum layer 18 has pits, the phosphoric acid aqueous solution enters through the pits to deteriorate the adhesion to the plastic film 12 or the inorganic underlayer 34.

On the other hand, as clearly seen from FIGS. 6(a) and 6(b), a recess (pit) was not found in the aluminum layer of the mold base 10 of Inventive Example 2, and the crystal grains of the aluminum layer of the mold base 10 were smaller than those of the aluminum layers of the mold bases of Comparative Examples 3 and 4. Therefore, it is seen that a dense aluminum layer was obtained. Thus, when the aluminum oxide layer 16 is provided, a dense aluminum layer 18 which does not have a pit can be obtained, so that the adhesion can be improved.

Although the buffer layer 16 used herein was formed by a single aluminum oxide layer, the buffer layer 16 may be formed by a plurality of aluminum oxide layers as previously described with respect to Inventive Example 1 when the plastic film 12 is used. For example, the buffer layer 16 was formed by three aluminum oxide layers, the first aluminum oxide layer provided on the inorganic underlayer 14 side in which the oxygen content was 60 at %, the second aluminum oxide layer provided on the aluminum layer 18 side in which the oxygen content was 1 at %, and the third aluminum oxide layer interposed between the first and second aluminum oxide layers in which the oxygen content was asymptotically gradient. In this case, the obtained results were excellent and were equal to or better than those of Inventive Example 2.

If the plastic film 12 used for formation of the motheye mold is a flexible plastic film, a motheye mold roll can be obtained by, for example, fixing the motheye mold onto the outer surface of a roll. The motheye mold roll is capable of continuously forming the motheye structure.

According to an embodiment of the present invention, as a matter of course, the aluminum layer can be formed on any plastic base which is different from the above-described plastic film.

For example, a motheye mold can be superimposedly formed over a mold for use in formation of an optical element which has a certain uneven shape in its surface, such as a lenticular lens, a brightness enhancement film (for example, a BEF manufactured by Sumitomo 3M Limited), a light guide plate, a microlens array, a Fresnel lens, etc.

A method of fabricating a mold that is for use in formation of a lenticular lens which has a motheye structure in its surface is described with reference to FIGS. 7(a) to 7(c).

Figure 7:
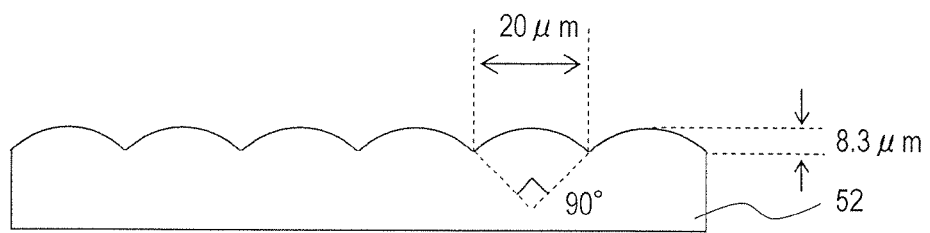
FIG. 7 (a) to (c) are schematic cross-sectional views for illustrating another method of fabricating a mold according to an embodiment of the present invention, specifically, a method of fabricating a mold for formation of a lenticular lens which has a motheye structure in its surface.
Figure 7:
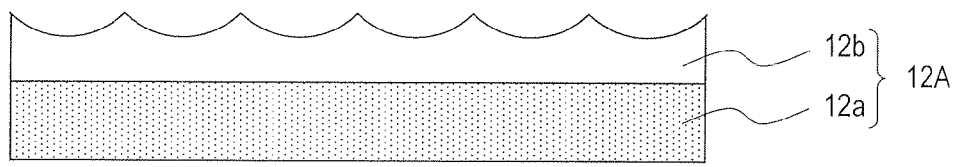
Figure 7:
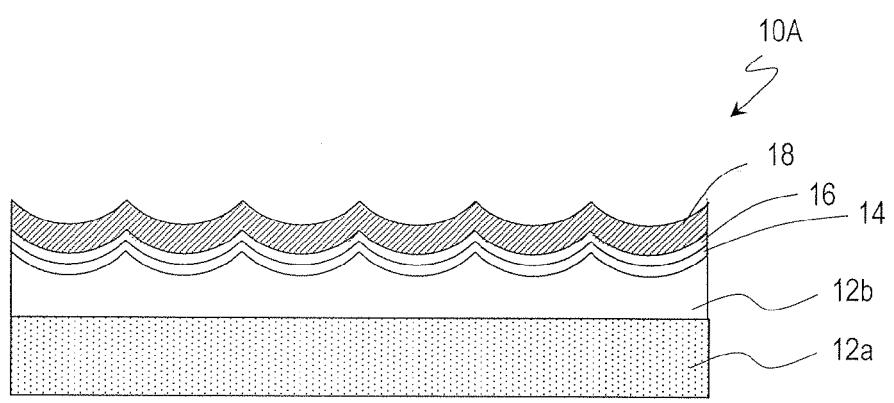

First, as shown in FIG. 7(a), a mold 52 which has an uneven structure that is similar to a lenticular lens is provided. The lenticular lens has a structure in which a plurality of semicylindrical lenses are arranged to extend in parallel. In a lenticular lens fabricated herein, the total size of the lenticular lens is 460 mm×365 mm, the pitch (the width of the semicylindrical lens) is 20 μm, and the central angle is 90° (a curve defined by intersection of the curved surface of the semicylindrical lens and a plane perpendicular to the longitudinal direction of the semicylindrical lens corresponds to a quarter of the circumference).

Then, as shown in FIG. 7(b), a photocurable resin layer (e.g., UV-curable resin layer) 12b which has an uneven structure that is inverse to the uneven structure of the mold 52 is formed on the plastic film 12a using the mold 52 shown in FIG. 7(a). The plastic film 12a may be made of, for example, COP or PET. A plastic base 12A which is formed by the plastic film 12a and the photocurable resin layer 12b corresponds to the plastic base 12 shown in FIG. 2.

Then, as shown in FIG. 7(c), an inorganic underlayer (e.g., SiO$_2$ layer) 14, a buffer layer (e.g., aluminum oxide layer) 16, and an aluminum layer 18 are formed on the photocurable resin layer 12b of the plastic base 12A which has the uneven structure according to the above-described method, whereby a mold 10A is obtained. Using the mold 10A enables manufacture of a lenticular lens which has a motheye structure in its surface.

For example, by using a flexible material for the plastic film 12a and the photocurable resin layer 12b, the flexible mold 10A can be obtained. If the mold 10A has flexibility, a mold roll can be obtained by fixing the mold 10A onto the outer surface of a roll as described above.

The above-described optical element has a periodic uneven structure, to which the present invention is not limited as a matter of course. A motheye mold may be superposed over a mold which is designed to form a non-periodic uneven structure. For example, as described in aforementioned Patent Documents 1, 2, and 4, a mold for formation of an antireflection film that has an antiglare property can be manufactured, in which a motheye structure is superposed over an uneven structure that has an antiglare function.

INDUSTRIAL APPLICABILITY

A mold of the present invention is widely applicable to formation of a surface which has a motheye structure, for example, formation of an antireflection film.

REFERENCE SIGNS LIST

| | |
|---|---|
| 10 | mold base |
| 12 | glass substrate (glass base) or plastic film (plastic base) |
| 14, 34 | inorganic underlayer |
| 16, 36 | buffer layer |
| 18, 18a | aluminum layer |
| 20 | porous alumina layer |
| 22 | micropore |
| 100 | motheye mold |

The invention claimed is:

1. A method of fabricating a mold that has an inverted motheye structure in its surface, the inverted motheye structure having a plurality of recessed portions whose two-dimensional size viewed in a direction normal to the surface is not less than 10 nm and less than 500 nm, the method comprising the steps of:
   (a) providing a mold base which includes a base made of glass or plastic, an inorganic underlayer provided on a surface of the base, a buffer layer provided on the inorganic underlayer, the buffer layer containing aluminum, and an aluminum layer provided on a surface of the buffer layer;
   (b) partially anodizing the aluminum layer to form a porous alumina layer which has a plurality of very small recessed portions;
   (c) after step (b), allowing the porous alumina layer to be in contact with an etching solution, thereby enlarging the plurality of very small recessed portions of the porous alumina layer; and
   (d) after step (c), further anodizing the porous alumina layer to grow the plurality of very small recessed portions.

2. The method of claim 1, wherein the inorganic underlayer is a silicon oxide layer or a titanium oxide layer.

3. The method of claim 1, wherein
   the buffer layer contains aluminum and either of oxygen or nitrogen, and
   the buffer layer has such a profile that a content of the aluminum is higher in a portion which is closer to the aluminum layer than in another portion which is closer to the inorganic underlayer.

4. The method of claim 1, wherein step (b) and step (c) are further performed after step (d).

5. The method of claim 2, wherein
   the buffer layer contains aluminum and either of oxygen or nitrogen, and
   the buffer layer has such a profile that a content of the aluminum is higher in a portion which is closer to the aluminum layer than in another portion which is closer to the inorganic underlayer.

6. The method of claim 2, wherein step (b) and step (c) are further performed after step (d).

7. The method of claim 3, wherein step (b) and step (c) are further performed after step (d).

* * * * *